Sept. 15, 1970    J. A. BRIGHT    3,529,241

SYSTEM FOR INDICATING RATE OF CHANGE OF VOLTAGE

Filed Jan. 19, 1967

INVENTOR.
JAMES A. BRIGHT
BY

United States Patent Office
3,529,241
Patented Sept. 15, 1970

3,529,241
SYSTEM FOR INDICATING RATE OF CHANGE OF VOLTAGE
James A. Bright, Denver, Colo., assignor to Hathaway Instruments, Inc., Denver, Colo., a corporation of Colorado
Filed Jan. 19, 1967, Ser. No. 610,445
Int. Cl. G01r 1/00, 19/12
U.S. Cl. 324—111     3 Claims

ABSTRACT OF THE DISCLOSURE

A system for detecting rates of change of voltage. An electronic circuit comprises a switch for connecting a voltage source and an RC circuit alternately and periodically to a utilization device which is thereby made responsive to the rate of change of the source voltage.

---

In electric power systems, by way of illustration, it may be important to detect not only changes in voltage occurring on a line but also the rates at which such changes occur. For example, a substantial change of voltage which occurs gradually may require no control or relay operation whereas a sudden change of the same magnitude may require switching operations to meet a sudden power demand or to initiate actuation of safety control devices. Various circuits and systems have been devised for this purpose but have not proved adequate for use in all applications, and accordingly it is an object of this invention to provide an improved system for detecting and indicating the rates of change of voltages in power lines and the like.

It is another object of this invention to provide an improved system for detecting rates of change of voltage and which is simple, accurate and reliable in operation.

Briefly, in carrying out the objects of this invention in one embodiment thereof a circuit is provided wherein the voltage of a source such as a power line is periodically alternated with the output of an RC circuit connected across the source to provide at the output of the system a difference voltage which is at all times proportional to the rate of change of the input voltage. This difference voltage is supplied to a utilization device for effecting actuation of whatever controls or indicating apparatus are employed for regulating or monitoring the operation of the source.

The features of novelty which characterize this invention are pointed out with particularity in the claims annexed to and forming a part of this specification. The invention itself, however, both as to its organization and method of operation, together with further objects and advantages thereof, may best be understood from the following description taken in connection with the accompanying drawing in which:

Figure 1:
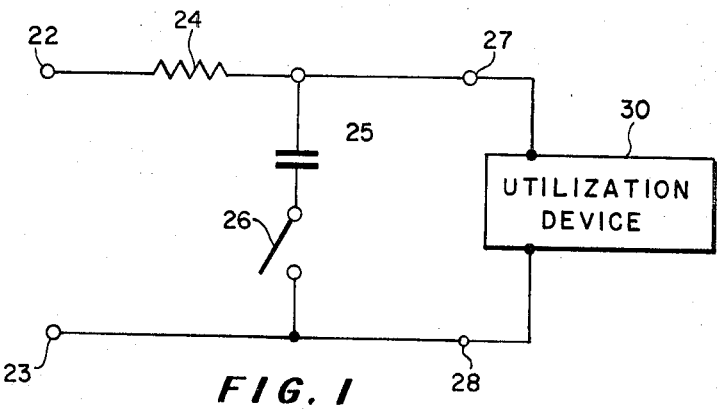
FIG. 1 is a schematic diagram of a circuit embodying the invention.

Referring now to the drawing, FIG. 1 illustrates a circuit embodying the invention for detecting rates of change of voltage. Here input terminals 22 and 23 are provided and a resistance 24 is connected in series across the terminals with a capacitor 25 and a switch 26. The output terminals indicated at 27 and 28 are connected across the capacitor 25 and switch 26 in series and a utilization device indicated at 30 is connected to the output. When the switch 26 is opened and closed periodically it results in connecting the utilization device first to be responsive to the input voltage, there being no current flowing through the resistor 24, and then responsive to the output voltage of the RC circuit as represented by the voltage across the capacitor 25.

When the switch 26 is operated to engage its two contacts alternately and rapidly at a sufficient rate, the difference voltage which appears across the output terminals is proportional to any rate of change of voltage at the input terminals 22 and 23. If there is no change in the voltage at the terminals 22 and 23, the same voltage appears at the output of the circuit regardless of whether the contact is engaged by a switch 26. When a change in voltage occurs at the input, the time constant of the resistance capacitance circuit produces a difference in voltage between the two terminals 27 and 28.

Figure 2:
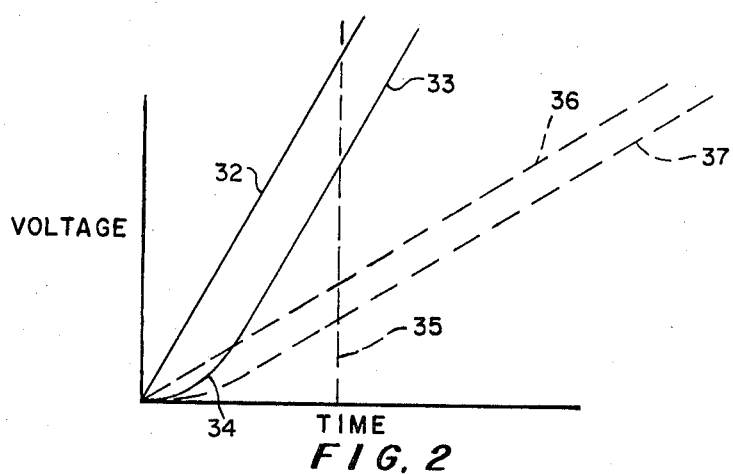
FIG. 2 is a graph illustrating the characteristics of the invention.

The characteristics of the circuit of FIG. 1 are illustrated in FIG. 2 wherein voltage is plotted against time. As an idealized condition, for purposes of illustration, a straight line starting at zero voltage and zero time and indicated at 32 represents a linear increase in voltage at the input terminals and a parallel line 33 represents the corresponding voltage across the capacitor 25 of FIG. 1. The curved portion of the curve 33 indicated at 34 represents the charging period of the capacitor 25 so that the horizontal distance between the curves 32 and 33 represents the time constant or delay time of the resistance capacitance circuit. The vertical distance between the curves 32 and 33 taken, for example, along the vertical line indicated by the dotted line 35 is proportional to the rate of change of the voltage impressed across the input of the circuit. In the event of a different rate of change, which may be represented, for example, by the line 36 corresponding to the curve 32, the output of the capacitor will be represented by a curve 37 and it will be noted that for this lower rate of change of voltage the vertical distance along line 35 has been reduced proportionately.

The difference in voltage representing or proportional to the rate of change is employed to energize the utilization device 30 and may, for example, effect an operating change in the system connected with the input of the apparatus whenever the difference exceeds a preselected value. The switch 26 is driven periodically at a rate sufficiently high that any frequency components present in the voltage at the input circuit can be eliminated, for example, by employing a high pass filter at the input of the utilization device 30.

Figure 3:
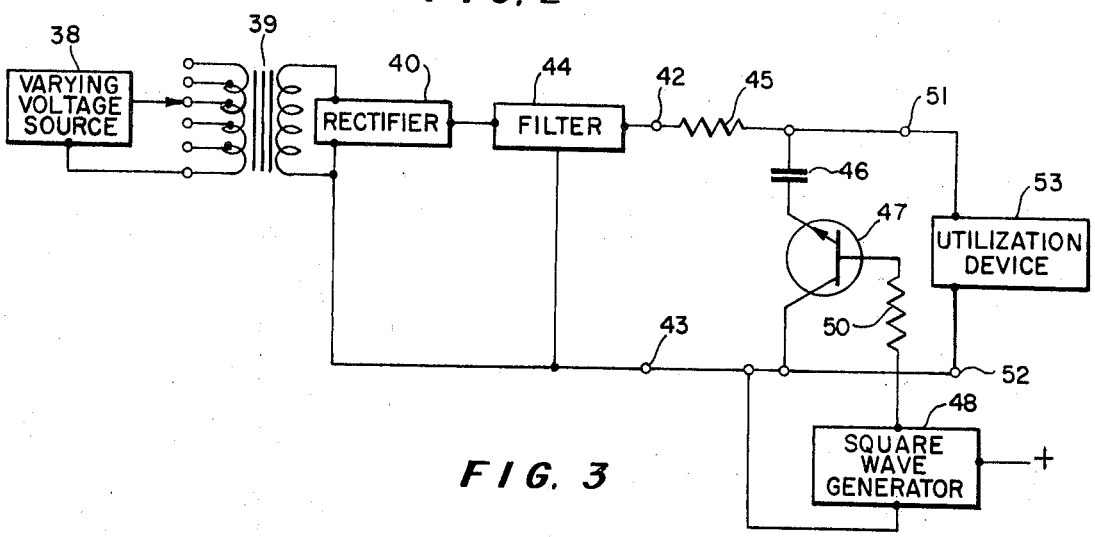
FIG. 3 is a schematic diagram illustrating a further embodiment of the invention.

FIG. 3 illustrates a circuit which employs chopper techniques for operating the periodic switch of the system of this invention and provides stable performance with shorter RC time constants and phase response. This circuit is essentially the same as that of FIG. 1 and illustrates the arrangement of the system when connected to a varying voltage source 38 through a transformer 39 having a tapped primary and having its secondary supplying a rectifier 40. The rectifier 40 supplies the terminals of the rate of change circuit indicated at 42 and 43 through a filter 44.

The rate of change circuit of FIG. 3 comprises a resistance 45, a capacitor 46 and a transistor 47 connected as a chopper to periodically open and close the circuit through the capacitor 46, the operation of the circuit being the same as that of FIG. 1. Triggering of the transistor 47 is effected by a square wave generator 48 connected to the base of the transistor 47 through a series resistance 50. The generator 48 may, for example, be operated at 1200 cycles per second, which is greatly in excess of frequency components present in the input of the circuit when, for example, the source is a 60-cycle power line. The output terminals of the circuit indicated at 51 and 52 are connected to the input of utilization device 53 which operates in the same manner as the device 30 of FIG. 1.

The fundamental circuit of FIG. 1 and the circuit of FIG. 3 provide simple and effective operation by employing a transistor chopper as shown in FIG. 3 connected as a simple shunt across the output in series with the capacitor 46. Thus the circuits of both FIG. 1 and FIG. 3 when their switches are driven periodically as described provide an output voltage which alternately represents the input signal and the output across the capacitor of the RC circuit. This voltage is equivalent to the voltage appearing across the output terminals 27 and 28 of the circuit of FIG. 1 and it will be understood that both circuits provide a differential signal which represents the rate of change of the voltage across the input, and a simple, rugged and effective circuit for detecting such rates of change of voltage is provided by the invention.

While the invention has been described in connection with specific applications and circuit arrangements, various modifications and other applications will occur to those skilled in the art. Therefore, it is not desired that the invention be limited to the details illustrated and described and it is intended by the appended claims to cover all modifications which fall within the spirit and scope of the invention.

I claim:

1. A system for indicating rates of change of a voltage comprising two input terminals for connecting to said apparatus a source of current subject to varying rates of change of voltage, two output terminals, a resistance connected between one of said input terminals and one of said output terminals, the others of said input and output terminals being connected to be at a common reference potential, signal utilization means connected across said output terminals, a capacitor, and means for connecting said capacitor periodically between said one output terminal and the other of said output terminals whereby there is impressed on said output terminals alternately the voltage across said input terminals and the voltage across said capacitor.

2. A system for indicating rates of change of voltage as set forth in claim 1 wherein the frequency of operation of said capacitor connecting means is greatly in excess of the frequency components present in the voltage at the source.

3. A system for indicating rates of change of voltage as set forth in claim 1 wherein said periodic connecting means comprises a transistor connected between said capacitor and said other output terminal and a square wave generator for triggering said transistor to render it alternately conducting and non-conducting.

References Cited

UNITED STATES PATENTS

| 2,564,829 | 8/1951 | Bedford et al. | 235—183 XR |
| 2,406,492 | 7/1969 | Dorsman | 324—118 XR |

RUDOLPH V. ROLINEC, Primary Examiner

E. F. KARLSEN, Assistant Examiner

U.S. Cl. X.R.

328—132; 307—152